INVENTORS.
ANTHONY F. MURTY
BENEDICT P. MURTY
BY
BUCKHORN, CHEATHAM & BLORE
ATTORNEYS

INVENTORS.
ANTHONY F. MURTY
BENEDICT P. MURTY
BY
BUCKHORN, CHEATHAM & BLORE
ATTORNEYS

June 25, 1963  A. F. MURTY ET AL  3,095,067
SAFETY BRAKE APPARATUS FOR VEHICLE
Filed Dec. 19, 1961  4 Sheets-Sheet 3

INVENTORS.
ANTHONY F. MURTY
BENEDICT P. MURTY
BY
BUCKHORN, CHEATHAM & BLORE
ATTORNEYS

June 25, 1963   A. F. MURTY ET AL   3,095,067
SAFETY BRAKE APPARATUS FOR VEHICLE
Filed Dec. 19, 1961   4 Sheets-Sheet 4

INVENTORS.
ANTHONY F. MURTY
BENEDICT P. MURTY
BY
BUCKHORN, CHEATHAM & BLORE
ATTORNEYS

United States Patent Office 3,095,067
Patented June 25, 1963

3,095,067
SAFETY BRAKE APPARATUS FOR VEHICLE
Anthony F. Murty and Benedict P. Murty, both of
0415 SW. Florida St., Portland, Oreg.
Filed Dec. 19, 1961, Ser. No. 160,560
17 Claims. (Cl. 188—170)

This invention relates to a safety brake apparatus for vehicles and more particularly to an improved apparatus for applying safety brakes by spring force when the pressure in a fluid pressure service brake system is below a predetermined minimum pressure.

The safety brake apparatus of the present invention is particularly adapted for large trucks or tractor-trailer combinations employed in highway transport. Such vehicles ordinarily have a service brake system actuated by compressed air under control of the driver of the vehicle. Such service air brake systems conventionally include storage reservoirs for air under pressure and in the case of a tractor-trailer combination, a reservoir is mounted on both the tractor and trailer. Relay valves are usually mounted on both the tractor and trailer so as to connect such reservoirs directly to the brake actuators or chambers under control of the operator of the vehicle when it is desired to apply the service brakes. Upon failure of the air pressure in the system for any reason, the brakes become inoperative.

Mechanisms for applying the brakes of the vehicle by spring force when the pressure in the service brakes system is below a predetermined minimum pressure have been employed on such vehicles. For this purpose heavy compression coil springs and associated compressed air actuators for compressing the springs and releasing the safety brakes, when the pressure in the system is above the predetermined value mentioned, have been mounted on axles of the vehicle. One commonly used arrangement is to mount the springs and spring brake release actuators upon and concentric with service brake chambers so that the brakes of the vehicle are applied by the springs when the pressure in the system fails.

Spring brake mechanisms of the type just described provide an effective parking brake system if the brake shoes are in reasonably good adjustment and the brake drums are not unduly expanded by being at elevated temperatures. Such elevated temperatures are produced by a prior long continued application of the service brakes, for example, when the vehicle is descending a long hill. The spring applied brakes can thus be employed under favorable conditions to hold a stationary vehicle against movement when the fluid pressure in the service brake system falls or is deliberately reduced in order to apply the spring brakes. Such spring applied brakes have not, however, proved satisfactory for application of emergency brakes when the vehicle is moving at high speeds and the service brake system fails for lack of air pressure, for example, due to the breaking of an air line. In general the types of springs necessarily employed result in emergency applications of the brakes which are too harsh when the brakes are in optimum adjustment and the brake drums cool and range down to emergency applications which are inadequate when the brakes are in poor adjustment or when the brake drums are overheated. This results from the fact that the brake applying spring force drops off rapidly as the brake shoes progressively wear or the brake drums expand due to being heated to thus vary the actual brake adjustment from optimum adjustment, the expansion of the springs required to apply the brakes increases and their brake applying spring force decreases. In order to approach an effective emergency application of the brakes when the actual adjustment of the brakes is not the optimum adjustment, the spring force is made considerably greater than desirable when the brakes are in such optimum adjustment. Also the emergency spring braking fails along with the service braking if the failure is due to wear of the brake bands or shoes or due to thermal expansion of the brake drums, since there is no provision for overtravel of the brake linkages during spring brake application past the position of maximum travel due to service brake applications.

In axle mounted spring brake systems of the type discussed above, it has not been possible to employ springs of sufficient size and length that the spring force remains reasonably constant throughout the required range of movement under the conditions encountered in the use of such vehicles. The longer and therefore heavier springs required to provide a more uniform spring force and necessary low rate of spring force fall off throughout such range along with the longer and heavier spring brake releasing air actuators and heavier mounting brackets also required, results in an excessive increase in unsprung weight carried by the axles. Also it has not always been possible to find available room for such longer and heavier springs along with the other required equipment upon the vehicle, particularly upon a short-wheel base tractor.

In accordance with the present invention, the problems discussed above have been solved by combining the spring safety brake apparatus with the reservoirs for compressed air for the service brake systems. An actuating spring for the safety brake is positioned within an air pressure reservoir and a spring brake release actuator or expansible chamber for compressing the spring is secured to and forms a part of the air pressure reservoir so that the entire safety brake mechanism including the air pressure reservoir, the spring contained therein and a spring brake release actuator occupies very little more space than the reservoir itself. In general, such reservoir is considerably larger than required for a spring of adequate size for effectively applying the safety brakes by spring pressure under even the most adverse conditions. Also the entire assembly can be mounted upon the frame of the truck or other vehicle and suitable linkage employed to connect the spring and release actuator to the brakes of the vehicle. The weight of such assembly is therefore sprung weight instead of unsprung weight.

In addition to reducing the unsprung weight of the vehicle, the improved structure just described also eliminates the flexible air lines required with axle mounted safety brake actuators, which lines are located in the vicinity of the wheels and are difficult to inspect and replace. Also the safety brake actuators are positioned at a relatively high elevation in the system and do not form a trap for oil and water as is the case with axle mounted actuators which usually form the low points in the system. Trapping of oil and water frequently causes damage due to deterioration of elements of the actuators by the oil or water or freezing of the water. Such location of the safety brake actuators does not complicate the service brake actuator linkage and furthermore the actuators are not in the way during changing of the service brake diaphragms or seals as part of the maintenance of the service brakes. Also the safety brake actuators are readily removable from their associated air pressure reservoirs to enable cleaning of such reservoirs to remove sludge and corrosive liquids which tend to accumulate therein.

Various arrangements of compressed air reservoir with a safety brake spring contained therein with an expansible chamber for compressing the spring to release the brakes are possible, including the mounting of two safety brake actuating springs in end to end relation in the same compressed air reservoir with such springs arranged to actuate the brakes on dual axles. In general, the expansible chamber of the release actuator for the safety brakes is expanded and full of compressed air at the pressure of the system during normal operation of the vehicle and such compressed air is also available for service brake applications down to the pressure at which the spring brakes are applied. This reduces the required size of the main compressed air reservoir.

It is desirable and, in fact, required by statute in some states that spring safety brakes be releasable by supplemental manually controlled devices when there is no air pressure in the brake system and within a short period of time after they have been applied due to failure of such air pressure. For example, it is entirely possible that a large truck or tractor-trailer combination may have its safety brakes automatically applied and the truck stopped in a position blocking a major highway or upon railroad tracks. In such cases it is imperative that the vehicle be rendered movable to a position of safety within a short period of time. In accordance with the present invention, devices are also provided for releasing the spring applied safety brakes either by mechanically or hydraulically actuated releasing devices insertable into the air pressure reservoirs at the time of use or permanently carried within such air pressure reservoirs. If desired, such brake releasing devices may be constructed so that the safety brakes are again automatically applied after a short time delay after they have been manually released so that it is impossible to leave the truck or tractor-trailer combination for any substantial length of time with the brakes released when there is also no air pressure in the service brake system.

The springs for applying the safety brakes are powerful springs maintained under stress at all times. Accidental release of such springs by a mechanic servicing the brakes can cause the springs to expand with explosive force with resultant injury to personnel or property. The safety brake applying spring and release actuator of the present invention are constructed as a unit in which the spring can not be released using the ordinary tools available to a mechanic. Thus the spring and safety brake release actuator unit must be removed from the vehicle and disassembled in a special press under controlled conditions. A replacement unit can, however, be immediately substituted for the removed unit so that the vehicle can return to service.

It is therefore an object of the present invention to provide an improved safety brake apparatus occupying a minimum amount of space on the vehicle and capable of effectively applying safety brakes under any conditions encountered upon failure of the air pressure in the service brake system.

Another object of the invention is to provide a safety brake system in which room is provided for a brake applying spring of much greater physical dimensions than the springs heretofore employed in spring applied safety brake systems without substantial increase in the over all space required for the complete brake system.

Another object of the invention is to provide a safety brake apparatus in which the brake applying spring and expansible chamber for compressing such spring to release the safety brakes are incorporated with and form a part of the air pressure reservoir of a compressed air service brake system.

A further object of the invention is to provide an improved spring applied safety brake apparatus in which the spring for applying such brakes upon failure of fluid pressure in a service brake system is housed in fluid pressure reservoir for such service brake system and the resulting assembly is supported upon the frame of the vehicle and connected to the vehicle brake shoes through suitable linkage.

A further object of the invention is to provide a spring applied safety brake apparatus in which the spring for applying the vehicle brakes upon failure of fluid pressure in the service brake system is housed in a fluid pressure reservoir for such service brake system and provision is made for manually releasing the spring applied brakes against the force of such spring.

A still further object of the invention is to provide a spring safety brake apparatus in which a large spring is employed to apply such safety brakes and is maintained in stressed condition at all times and which apparatus is such that it is impossible to release such spring by disassembling the spring brake apparatus with conventional tools, thus preventing injury to property or to personnel working on the spring brakes system.

Other objects and advantages of the invention will appear in the following detailed description thereof, given in connection with the attached drawings of which.

Figures 1, 2:
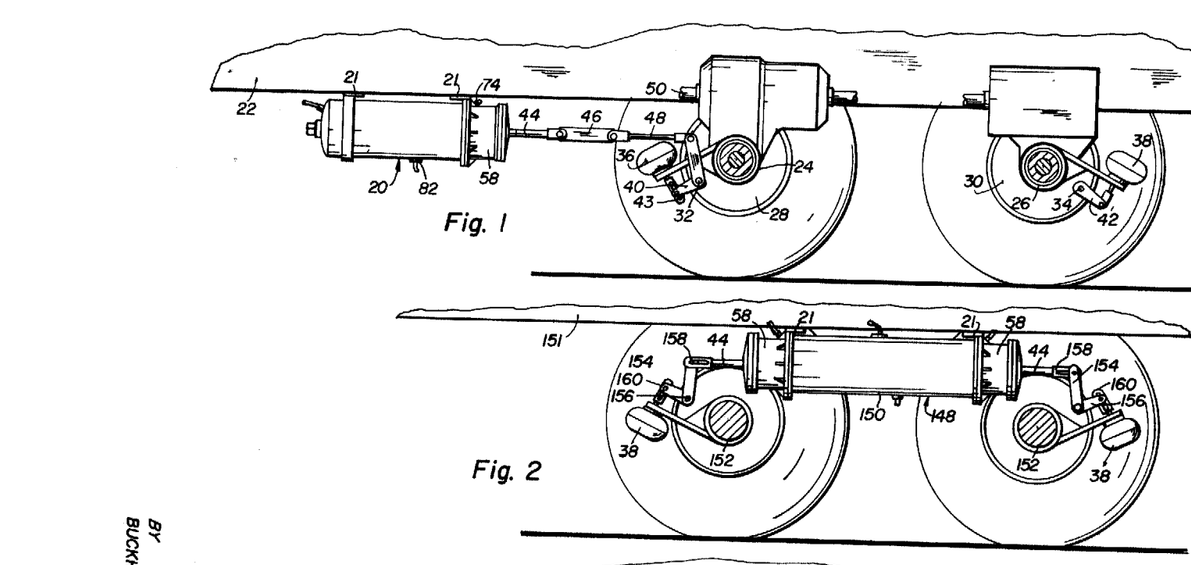
FIG. 1. is a fragmentary view, partly in section and partly in side elevation, showing safety brake apparatus of the present invention applied to one rear axle of a dual-rear axle truck or tractor.
FIG. 2 is a view similar to FIG. 1, showing a modification including a dual spring safety brake apparatus applied to the brakes on both the axles of a dual axle trailer.

Referring more particularly to the drawings, safety brake apparatus particularly adaptable for application to one of the rear axles of a dual rear axle truck or tractor may include safety brake apparatus 20 secured to and supported by brackets 21 by a truck frame 22. The truck or tractor may have dual axles and be provided with dual axle housings 24 and 26 and may also have brake drums 28 and 30 supported on the ends of the axle housings 24 and 26, respectively. Conventional brake actuating shafts 32 and 34 are shown in FIG. 1, and it will be understood that such shafts will be journaled in suitable bearings in the brake drums 28 and 30, respectively, and in bearings secured to the axle housings 24 and 26, respectively. Conventional compressed air service brake chambers 36 and 38 are shown as being carried by the axle housings 24 and 26, respectively, and as being connected through lever arms 40 and 42, respectively, to the brake actuating shafts 32 and 34, respectively. The lever arms 40 and 42 are shown in the positions they occupy when the air pressure in the system is sufficiently low that the spring safety apparatus has applied the brakes in the drum 28 but it will be understood that upon compressed air being supplied to the particular system shown by way of example, the spring application of the brakes can be released and also such air can be supplied to the chambers 36 and 38 to cause a service application of the brakes in the brake drums 28 and 30 either before or after release of the safety brakes. The lever arm 40 secured to the brake shaft 32 is shown as being connected to the brake chamber 36 through a slotted lost motion connection 43 to provide for application of the brakes in the brake drum 28 by the safety brake apparatus 20 independently of the service brake chamber 36.

To produce a safety brake application, a piston rod 44 extends from the safety brake apparatus 20 and is connected through a drop link 46 to one end of a pull rod 48, the drop link 46 being pivoted at its opposite ends to the piston rod 44 and pull rod 48. The pull rod 48 is in turn pivoted at its other end to one end of a lever arm 50 having its other end secured to the brake actuator shaft 32 for rotating such shaft in a counterclockwise direction in FIG. 1 to apply the brakes. The drop link 46 constitutes a lost motion connection so that the brake actuating shaft 32 can also be rotated in a counterclockwise direction in FIG. 1 by the brake chamber 36 to apply the brakes in the brake drum 28 through the lost motion connection 43 and the lever arm 40 when the safety brakes have been released by movement of the piston rod 44 and associated parts to the right in FIG. 1. It will also be understood that the brake actuating shaft 32 is resiliently urged in a clockwise direction in FIG. 1 by springs in the brake drum 28 to release the brakes and that a counterclockwise rotation of such shaft applied the brakes.

Figures 4, 4A, 5, 6:
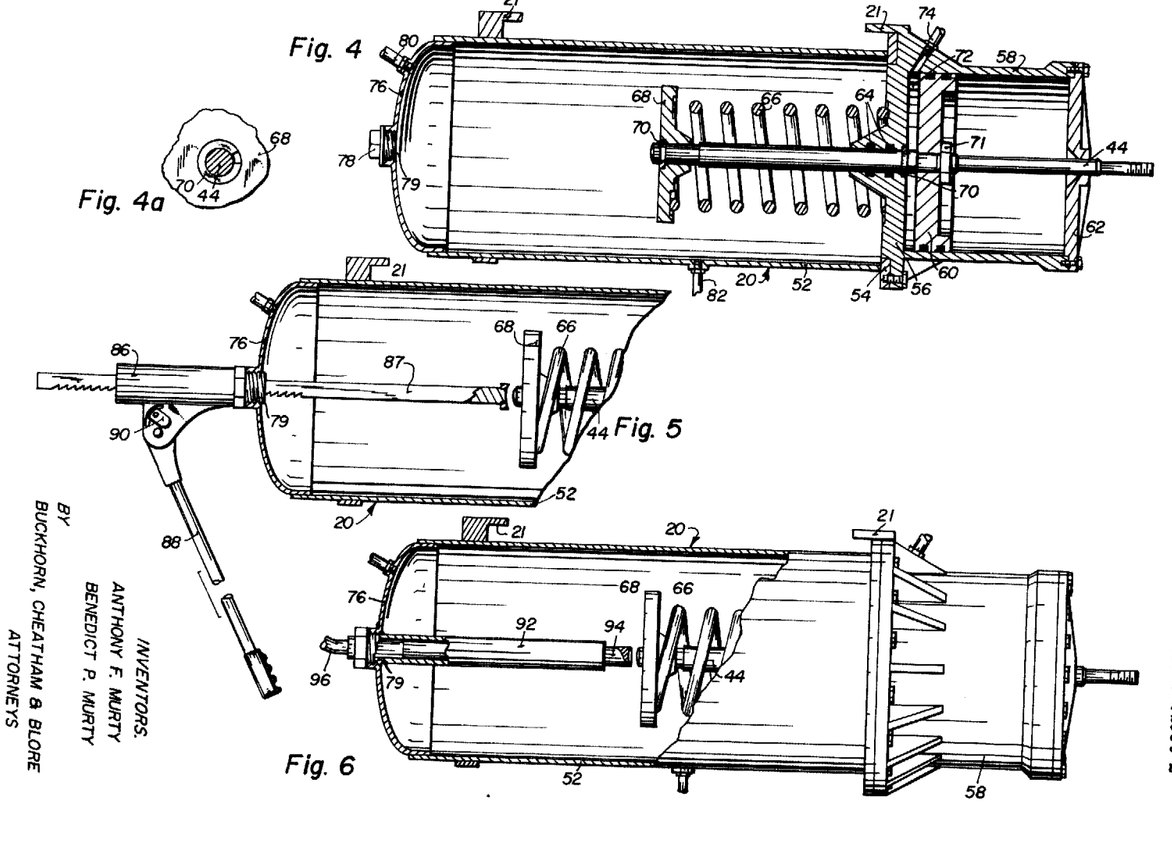
FIG. 4 is a vertical longitudinal section through safety brake apparatus of the type shown in FIG. 1.
FIG. 4a is a fragmentary end view on an enlarged scale of a split ring retainer employed to secure parts of the apparatus of FIG. 4, together to prevent accidental release of the brake applying spring.
FIG. 5 is a partial view similar to FIG. 4, showing a manual mechanical release device for safety brake apparatus of the type shown in FIGS. 1 and 4.
FIG. 6 is a view partially in vertical section and partially in side elevation, showing a modified manual release of the hydraulic type for a safety brake apparatus of the type shown in FIGS. 1 and 4.

The internal structure of the safety brake apparatus 20 of FIG. 1 is shown in FIG. 4. Such apparatus includes a reservoir or storage tank 52 for compressed air for the service brake system. The reservoir 52 has a flange 54 at one end to which is secured one end 56 of a safety brake releasing cylinder 58. The end 56 of the cylinder 58 forms a closure for one end of the reservoir or storage tank 52 and a safety brake releasing piston 60 is positioned in the cylinder 58. The other end of the cylinder 58 is closed by a closure member 62. The piston rod 44 extends through and is rigidly connected to the piston 60. One end of such piston rod 44 extends to the exterior of the cylinder 58 through the closure member 62 and the other end of such piston rod extends through the end 56 of the cylinder 58 into the reservoir or storage tank 52 through a suitable packing structure, such as the O-rings 64. Such other end of the piston rod 64 is surrounded by a heavy coiled safety brake applying compression spring 66 which has one end bearing against the end 56 of the cylinder 58 and the other end bearing against a thrust member 68 carried by and secured to the piston rod 64. The spring 66 and cylinder 58 thus form parts of a spring and actuator unit which can be easily removed in its entirety from the remainder of the safety brake apparatus.

The spring 66 in FIG. 4 is shown in its expanded or greatest possible safety brake applying position, and even in such expanded position develops a very substantial spring force. It is therefore dangerous for the operator of the truck or a mechanic without proper tools to attempt to disassemble the unit including the spring 66 and cylinder 58. The thrust member 68 is mounted for limited sliding movement upon a reduced end of the piston rod 44 and such thrust member 68 and the cylinder end 56 engage retaining rings 70, one of which is shown in FIG. 4a when the spring 66 is in expanded condition. The retaining rings 70 extend into grooves in the piston rod 44 and also into cooperating recesses in the thrust member 68 and cylinder end 56. The recesses in the thrust member 68 and cylinder end 56 cover the outer peripheries of the retaining rings 70 to prevent removal of such rings from the grooves in the piston rod 44 as long as the spring 66 holds the thrust member 68 and cylinder end 56 in the positions on the rod shown in FIG. 4. The unit just described can be disassembled for servicing only by removing the unit from the remainder of the safety brake apparatus and then forcing the thrust member 68 toward the cylinder end 56 in a suitable press against the action of the spring 66 so that a retaining ring 70 can be removed while the unit is in the press. The spring can then be allowed to expand gradually in the press under controlled conditions. The piston 60 is held in position against a shoulder on the shaft by a nut 71 and can be removed at any time for servicing or replacement by removing the cylinder closure member 62 and then unscrewing the nut 71.

The cylinder 58 and the piston 60 provide an expansible chamber 72. A connection 74 for supplying compressed air to such expansible chamber is provided in the wall of the cylinder 58 and it will be apparent that admitting compressed air into the expansible chamber 72 will cause the piston 60 to move to the right in FIG. 4 to compress the spring 66 and move the piston rod 44 to the right. Movement of the piston rod 44 to the right releases the brakes applied by the force of the spring 66. By properly proportioning the piston area of the piston 60 and the size of the spring 66, the safety brakes can be caused to release at any desired predetermined air pressure, for example, a pressure of 40 p.s.i. supplied to the expansible chamber 72.

The end of the reservoir or storage tank 52 opposite the cylinder 58 is closed by an end member 76 provided with an access plug 78 of substantial diameter screw-threaded into a corresponding centrally positioned opening 79 in the end member 76. Such end member 76 may also be provided with one or more air connections 80 and also the body of the storage tank 52 may be provided with one or more air connections 82.

It is sometimes desirable to move a vehicle provided with the safety brakes of the present invention when there is no air pressure in the system to release such brakes. A mechanically actuated manual safety brake release mechanism is shown in FIG. 5 as applied to a safety brake apparatus 20 of the type shown in FIGS. 1 and 4. Such manual release device may be a conventional mechanically hand-operated jack of the bumper jack type, having its body portion 86 modified to provide screw threads at one end adapting it for substitution for the access plug 78 of FIG. 4. Such jack may be screwed into the opening 79 in the end member 76 of the reservoir 52 so as to have its movable member 87 in alignment with the piston rod 44. By manual manipulation of the handle 88 of the jack, the piston rod 44 can be moved to the right in FIG. 5 against the action of the spring 66 to release the safety brakes. A manually actuated jack of the type shown can be carried for each of the safety brake apparatus required to be released so that the vehicle can be moved from a position of danger, even though no air pressure is available. In fact such jacks can be permanently installed in the reservoir, if desired. Conventional jacks are provided with a reversing lever 90 so that the spring 66 can be again allowed to expand by manipulation of the jack lever to cause the piston rod 44 to move to the left in FIGS. 1 and 5 to again apply the safety brakes after the vehicle has been moved to a position of safety. Repairs can then be made to the service brake system and when air pressure is again available, the safety brakes can again be released and the service brakes applied.

A modified safety brake releasing device, also adaptable to the safety brake apparatus 20 of FIGS. 1 and 4, is shown in FIG. 6. Such safety brake release apparatus includes a small hydraulic cylinder 92 which may be inserted into the opening 79 in the end member 76 of the reservoir 52 in substitution for the plug 78 of FIG. 4.

Such cylinder has a plunger 94 in alignment with the piston rod 44 and has an external hydraulic connection 96 leading to a hand-operated hydraulic pump as described below. It will be apparent that the introduction of hydraulic fluid under pressure through the connection 96 into the cylinder 92 will move the piston rod 44 of FIGS. 1 and 6 to the right in such figures to release the safety brakes. Upon release of such pressure the safety brakes are again applied.

Figure 10:
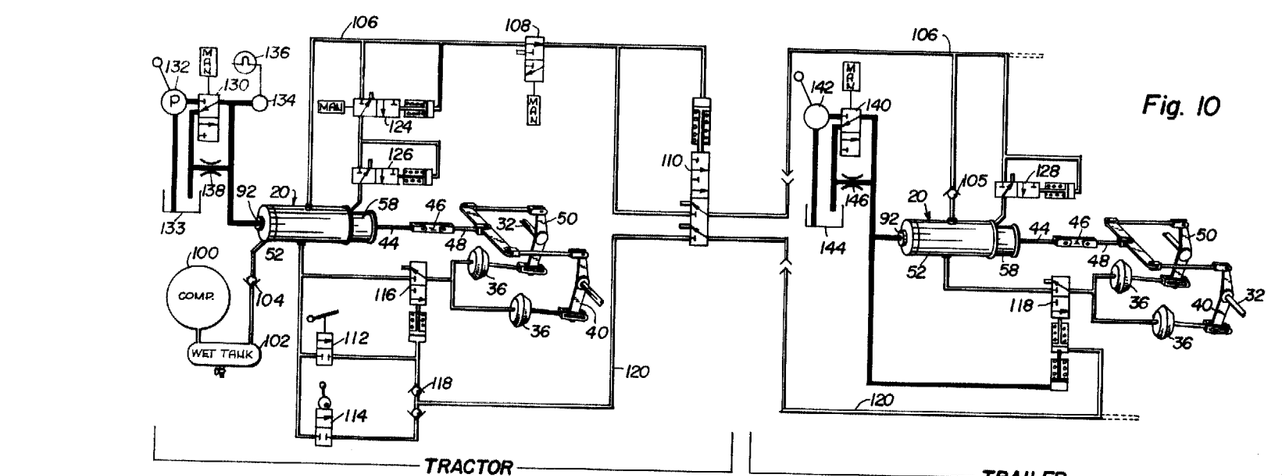
FIG. 10 is a schematic diagram of a brake system for a tractor-trailer combination including safety brake apparatus in accordance with the present invention in conjunction with hydraulic manual release devices therefor, all shown in association with a compressed air service brake system.

The brake system shown diagrammatically in FIG. 10 includes compressed air service brake chambers 36 and safety brake apparatus 20 of the type shown in FIGS. 1 and 2 including hand-operated hydraulically actuated safety brake release devices 92 of the type shown in FIG. 5. Such system also includes a compressor 100 mounted on the tractor and driven from any suitable source of power, conventionally the internal combustion engine driving the tractor. The compressor supplies air under pressure to a wet tank 102 and from the wet tank through a check valve 104 to the reservoir 52 forming part of a tractor safety brake apparatus 20 of the present invention. The compressor also supplies compressed air to the reservoir 52 of a safety brake apparatus 20 mounted on a trailer through another check valve 105, such supply of compressed air also being through a tractor emergency line 106, an emergency valve 108, and a tractor protection valve 110 when such valves are in the proper positions as discussed below. The pressure in the reservoirs 52 of the two safety apparatus 20 is available for service brake application on both the tractor and the trailer by the brake chamber 36 thereon under control of a foot-operated service brake valve 112, or for application of the service brake on the trailer only under control of a hand-operated service brake valve 114. The supply of compressed air to the service brake chamber 36 of the tractor is through a relay valve 116 actuated by the foot-operated valve 112. The relay valve connects the chambers 36 directly to the reservoir 52 on the tractor. The supply of compressed air to the service brake chambers 36 of the trailer under control of the foot-operated valve 112 is through a relay valve 117 which connects such brake chambers directly to the reservoir 52 on the trailer. Such relay valve 117 is actuated from the foot-operated valve through one side of a double check valve 118, a service line 120, and the tractor protection valve 110 when the latter valve is in its alternate position from that shown in FIG. 10. The hand-operated valve 114 actuates only the trailer service brakes through the other side of the double check valve 118, service line 120, tractor protection valve 110 and relay valve 122.

The safety brake application on the tractor can be released through manual actuation of a tractor safety brake valve 124 by manually actuating the tractor safety brake valve 124 to brake releasing position after the pressure in the reservoir 52 on the tractor builds up above a predetermined pressure. The safety brakes on the trailer cannot be released until the tractor pressure builds up to a somewhat higher pressure sufficient to operate the tractor protection valve 110 to its alternate position from that shown in FIG. 10.

The safety brakes on the tractor are released by pressure delivered to the cylinder 58 thereon through the tractor safety brake control valve 124 and a quick release valve 126. Such safety brakes can be manually applied by operation of the tractor safety brake valve 124 to exhaust air pressure from the quick release valve 126. This operates such valve to connect the cylinder 58 on the tractor directly to atmosphere. Similarly, the safety brakes can be applied on the trailer by actuation of the emergency valve 108 to exhaust pressure from the portion of the emergency line leading to the tractor protection valve 110. This causes the latter valve to exhaust pressure from the quick release valve 128 to connect the cylinder 58 on the trailer directly to atmosphere.

Separate hydraulic manual release devices for the safety brakes are shown for both the tractor and trailer. Each includes a hydraulic cylinder 92. The hydraulic cylinder 92 on the tractor is connected through a manually operated control valve 130 to a hand-operated hydraulic pump 132 positioned in the cab of the tractor and obtaining hydraulic fluid from a source 133. The valve 130 is shown in release position but upon moving the valve to its alternate position, the hand pump 132 can be employed to pump hydraulic fluid into the safety brake release hydraulic cylinder 92 on the tractor to thus release the safety brakes. A pressure sensing device 134 may be employed to cause lighting of a signal lamp 136 when there is sufficient pressure in the cylinder 92 to release the safety brakes. A restricted bleed orifice 138 may be positioned between the cylinder 92 and the return line to the source 134 so as to bleed pressure out of the cylinder 92, thus again causing the safety brakes to be applied after a short interval of time if the air pressure is low in the brake system. The manual safety brake release for the trailer may include a manual control valve 140, a hand pump 142, a source of hydraulic fluid 144 and a restricted orifice 146, functioning in the same manner as the equivalent valve 130, pump 132, source 134 and restricted orifice 138 for the tractor. The pump 142 on the trailer will, however, be usually located in any convenient position under the trailer frame or under the trailer body so as to be accessible from the side of the trailer.

A brief description of the operation of the system of FIG. 10 is given below. If there is no air pressure in the system and no manual control is being exercised on the system, the various valves can be in the position shown except that the emergency valve will ordinarily be in its alternate position from that shown in FIG. 10. A safety brake application will be produced by springs 66 (FIG. 4) in the reservoirs 52 of the two safety brake apparatus 20. There can be no service brake application by the brake chambers 36 since there is no pressure in the system. Starting up the compressor will build pressure up in the reservoir 52 on the tractor but will not in any of the safety brakes, since the valve 124 will not move to its alternate position from that shown in FIG. 10 except by manual actuation and the valve 108 is assumed to be in its alternate position from that shown. The only way the tractor safety brakes can be released is for the operator to be in the cab so as to be in a position to manually move the valve 124 to its alternate position after the pressure in the tractor reservoir 52 is above a predetermined pressure or to hold such valve against the action of the spring shown in connection with such valve until such predetermined air pressure holding the valve in such position is produced by the compressor filling the reservoir 52. At or above about 40 p.s.i. pressure, the quick release valve 126 for the tractor safety brakes will move to its alternate position to introduce such pressure into the tractor safety brake release cylinder 58 and release the tractor safety brakes. The operator is thus in a position to apply the tractor service brakes by the foot control valve 112 when the tractor safety brakes release, since he is in the cab, and the pressure in the system is sufficiently great to apply such brakes. At about 45 p.s.i. pressure in the system, the safety brake release valve 124 is held in its alternate position by fluid pressure and the tractor safety brakes held in released condition.

At a somewhat higher pressure, for example 70 to 75 p.s.i., the tractor protection valve 110 will move to its alternate position to supply fluid pressure to the reservoir 52 of the trailer through the quick release valve 128, which may be of the same type as the quick release valve 126 on the tractor. The operator will ordinarily let the pressure in the reservoir build up to above this pressure and then move the emergency valve to the position shown in FIG. 10. This will cause operation of the tractor protection valve 110 and will drop the pressure in the system as the reservoir 52 on the tractor falls but not below the pressure at which the safety brake release valve 124 will drop out. The tractor protection valve will stay in its alternate position at such lower pressure, for example, such valve will not move back to its position shown in FIG. 10 until the pressure in the emergency line 106 drops below 50 to 55 p.s.i.

Upon failure of fluid pressure in the system for any cause, such as failure of the compressor or the breaking of an air pressure line or reservoir, both the tractor and trailer safety brakes will be immediately applied by the springs 66 in the safety brake apparatus 20. If the trailer breaks away from the tractor, the pressure in the trailer portion of the emergency line 120 will drop to cause the quick release valve 128 to exhaust the safety brake cylinder and cause the trailer safety brakes to be immediately applied. The pressure in the tractor system will also fall but at about 50 to 55 p.s.i. in the tractor emergency line 106, the tractor protection valve 110 will isolate the tractor brake system from the trailer brake system. Thus the safety brakes will be immediately applied on the trailer but not on the tractor and the service brakes on the tractor remain entirely operative.

When the spring operated safety brakes have been applied upon either the tractor or trailer, they can be manually released by use of the respective manually actuated hydraulic pump 132 or 142. Thus the safety brakes on the tractor can be released by manual actuation of the pump 132 after moving the control valve 130 manually to its alternate position from that shown in FIG. 10. When there is no air pressure in the service brake system, the safety brakes can again be immediately applied by merely moving the valve 130 to its position shown in the drawing. The hydraulic safety brake release system on the tractor is shown as having a bleed orifice 138 between the hydraulic brake release cylinder 92 and the source 133 so that the safety brakes will not remain released for any substantial length of time, for example, more than five minutes without renewed actuation of the hand pump 132. The orifice may be omitted if it is desired to have complete manual control of the manual release of the safety brakes. The hydraulic safety brake release system of the trailer operates in the same manner. The hand pump for the manual release of the tractor safety brakes will ordinarily be mounted in the cab, whereas the pump for the trailer will ordinarily be mounted beneath the trailer adjacent one side thereof so as to be accessible from the side of the trailer, thus enabling the person releasing the brakes to be out of the danger area underneath the trailer while manually releasing the safety brakes.

If it is not desired to employ the hydraulically operated safety brake manual release system shown in FIG. 10, then the mechanical safety brakes manual release shown in FIG. 5 may be employed and the handles 88 for the various manually actuated jacks can be of sufficient length that the operator thereof can be out of the danger zone underneath the tractor or trailer when manually releasing the safety brakes.

Figure 7:
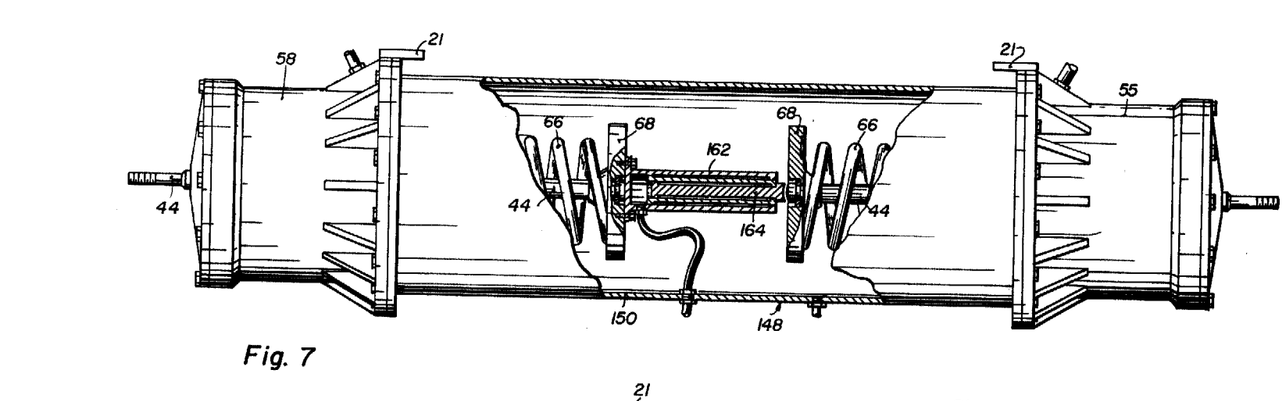
FIG. 7 is a view similar to FIG. 6, showing safety brake apparatus of the type shown in FIG. 2 with a modified hydraulic manual release device for the safety brake apparatus.

In the modified safety brake apparatus of FIGS. 2 and 7, a storage reservoir 150 supported by a vehicle frame 151 is employed having open ends with a safety brake release cylinder 58 attached to and forming an end closure for each end thereof. Such device 150 is particularly adaptable for applying safety brakes carried by both the axle housing 152 of a trailer having dual axles. Such cylinders 58 may have their piston rods 44 connected to lever arms 154 secured to brake actuating shafts 156 through slotted lost motion connections 158 pivoted to such piston rods. Conventional service brake chambers 38 which may be the same as those shown in FIG. 1, may likewise be mounted upon the axle housing 152 and each arranged to actuate a brake shaft 156 through slotted lost motion connections 160.

The reservoir 150, shown in FIG. 7, may be of sufficient length to accommodate two safety brake applying springs 66 and a single telescoping type of hydraulic cylinder 162 may be mounted upon one of the thrust members 68 engaging one of the springs 66 and may have a plunger 164 positioned to engage the end of the piston rod 44 upon which the other safety brake applying spring 66 is mounted. It will be apparent that introduction of hydraulic fluid under pressure into the cylinder 162 by a manual actuated pump, such as the pump 142 of FIG. 10, will compress the spring 66 to release the safety brakes.

The modified safety brake apparatus 166 is similar to that shown in FIG. 7 and can be employed in the same manner as the similar apparatus 148 of FIGS. 2 and 7. The device 166 of FIG. 9 may be of somewhat shorter length than the apparatus 148 for the same length of springs 66. Modified thrust members 168 attached to shortened piston rods 170 and 171 are employed. Such thrust members extend inwardly of the ends of the springs 66 and have pockets 172 therein in which a safety brake release hydraulic cylinder 174 may be positioned. Such cylinder is carried by piston rod 170 and contains a plunger 176 for engaging the end of the other piston rod 171 for releasing the safety brakes when hydraulic fluid under pressure is introduced into the cylinder 174. The cylinder 174 and plunger 176 may be of sufficient length that both springs 66 can be compressed to release the safety brakes applied by the springs 66 through the piston rods 170 and 171. The safety brake apparatus 166 is particularly adaptable to dual axle installations having safety brakes upon both axles where the space available for mounting the safety brake apparatus is at a minimum.

Figure 3:
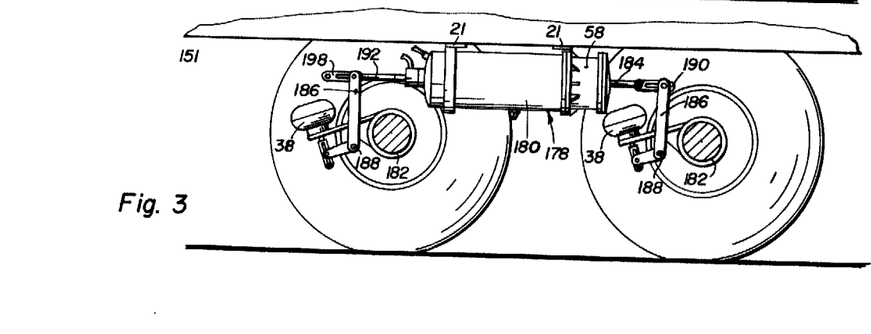
FIG. 3 is a view similar to FIG. 1, showing another modification of safety brake apparatus in accordance with the present invention mounted on a trailer having dual axles.
Figure 8:
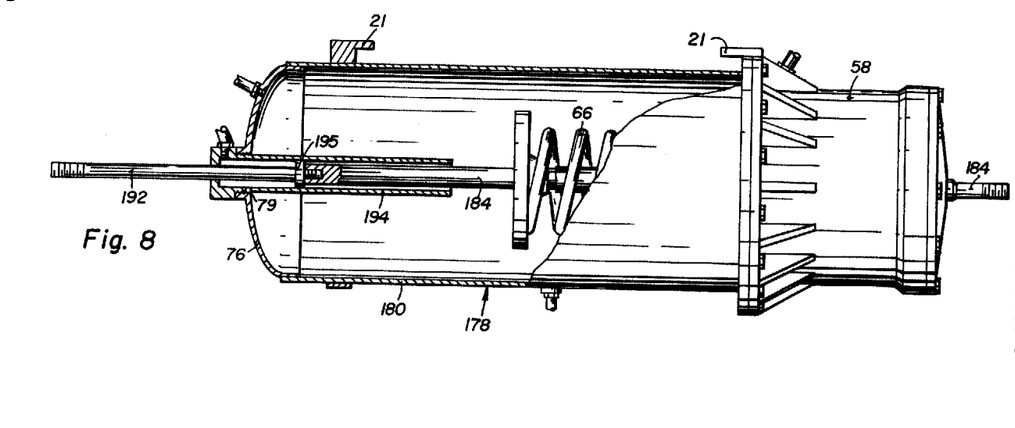
FIG. 8 is a view similar to FIG. 6, showing a still further modified hydraulic manual release for a safety brake apparatus of the type shown in FIG. 3.
Figure 9:
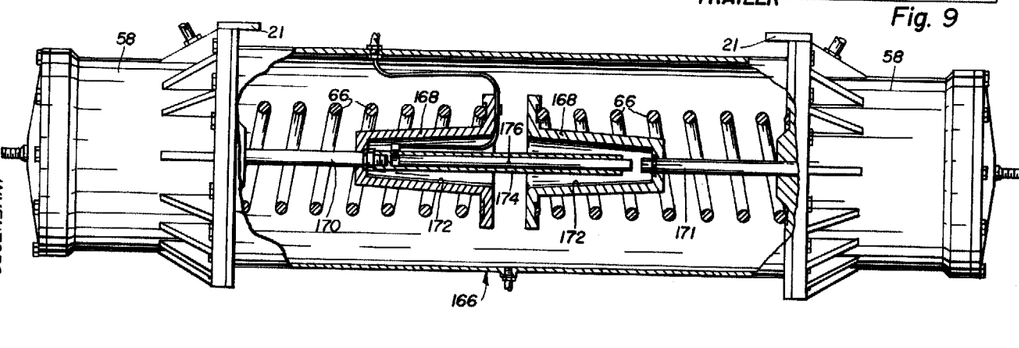
FIG. 9 is a view similar to FIG. 6 of a modified dual safety brake actuating mechanism of the general type shown in FIG. 2 with a modified type of hydraulic manual safety brake release device.

The modifications of safety brake apparatus shown in FIGS. 2, 7 and 9 are primarily adapted for safety brake installations where a pull is required on the lever arms operating the brake shafts adjacent the two ends of such apparatus in order to apply the safety brakes. The modified safety brake apparatus 178 shown in FIGS. 3 and 8 is particularly adaptable to brake installations where a pull is required at one end of the apparatus for setting the safety brakes and a push at the other end. Thus the safety brake apparatus 178 may include a reservoir 180 in which is positioned a single safety brake spring 66 of sufficient spring force to set the brakes associated with both of the axle housings 182 of a dual axle trailer. The apparatus 178 has a safety brake release cylinder 58 at one end only and a piston rod 184 extends from one end of such cylinder to apply the brakes associated with one axle housing 182 by pulling action through such rod 184. Such piston rod is connected to a lever arm 186 secured to a brake shaft 188, the connection between the piston rod 184 and the lever arm 186 being through a slotted lost motion connection 190 pivoted to the end of the piston rod 184.

An extension piston rod 192 secured to the end of piston rod 184 extends through a manual brake release hydraulic cylinder 194 and has a piston 195 thereon. The cylinder 194 is mounted in the closure member 76 for the reservoir 180 and introduction of hydraulic fluid under pressure in such cylinder will compress the spring 66 to release the brakes. The piston rod 192 applies the brakes associated with axle housing 182 by a push operation through a slotted lost motion connection 198 pivoted to a lever arm 186 secured to a brake shaft 188 so that motion of the piston rods 184 and 192 to the left in FIGS. 3 and 8 applies the safety brakes and motion of such rods to the right in such figures caused by either the air actuated safety brake release cylinder 58 or the manually actuated release including the hydraulic cylinder 194, will release such safety brakes.

It will be apparent that the present invention provides safety brake apparatus for applying safety brakes by spring pressure on failure of fluid pressure in an air brake system, which apparatus occupies a minimum of space and enables the employment of brake applying springs of adequate size and length to operate effectively even when the brake shoes of the vehicle have become excessively worn or are out of adjustment. In all of the figures of the drawings, such safety brakes are shown in applied position and, in general, the safety brakes will be completely applied before the piston 60, such as shown in the safety brake apparatus 20 of FIG. 4, has approached the left end of the cylinder in such figure so that there is always reserve spring power to apply the safety brakes even though the brake shoes are nearly worn out. Such safety brake apparatus thus has sufficient range of movement of its piston and piston rod that the travel of the piston rod toward the brake applying position by actions of the spring 66 will continue after the actuating rods of the usual service brake chambers 38 have reached the limit of their travel. It will be noted that the various lost motion connections illustrated in the drawings provide for such travel of the piston rods of the safety brake apparatus under spring force past the limit of travel of the actuating rods of the service brake chambers. This is possible since the safety brake apparatus is separate from any associated service brake chamber 38 in all cases. Also the brake applying springs can be of sufficient size and length that the drop off in spring force with a given increase in length of the springs is very much less than is the case when safety brake apparatus is mounted directly upon an axle upon which a service brake chamber 38 is mounted, or form a part of such service brake chamber. Mounting the safety brake apparatus upon the frame of the truck or trailer reduces the unsprung weight not only by removing such weight from the axles but also by decreasing the necessary size of the brackets and other support structures required to support the weight of such spring actuated safety brake apparatus. It is, in fact, not feasible to mount upon such axles safety brake apparatus of the size required for effective and reliable operation of spring operated safety brakes under all conditions of brake shoe wear and adjustment and of a size useful for emergency stopping of the vehicles when traveling at high speed.

While specific embodiments of safety brakes apparatus have been disclosed, it is to be understood that the invention is not to be limited to details thereof but that it may be varied within the scope of the following claims.

We claim:

1. Safety brake apparatus for vehicles comprising:
a storage reservoir for fluid under pressure,
spring means for applying safety brakes on said vehicle by spring force,
expansible chamber means operative for releasing said safety brakes against said spring force,
said expansible chamber means being attached to said reservoir and said spring means being positioned within said reservoir.

2. Safety brake apparatus for vehicles having a fluid pressure brake system, said apparatus comprising:
a storage reservoir for fluid under pressure,
spring means for applying safety brakes on said vehicle by spring force when fluid pressure in said system falls below a predetermined value,
and expansible chamber means operative for releasing said safety brakes against said spring force only when said fluid pressure in said system is above said predetermined value,
said spring means being positioned within said reservoir.

3. Safety brake apparatus for vehicles having a fluid pressure brake system, said apparatus comprising:
a storage reservoir for fluid under pressure,
spring means for applying safety brakes on said vehicle by spring force when fluid pressure in said system falls below a predetermined value,
and expansible chamber means operative for releasing said safety brakes against said spring force only when said fluid pressure in said system is above said predetermined value,
said expansible chamber means forming a part of said reservoir,
and said spring means being positioned within said reservoir.

4. Safety brake apparatus for vehicles having a frame and a fluid pressure brake system including a brake chamber and brakes mounted on an axle, said apparatus comprising:
a storage reservoir for fluid under pressure,
spring means for applying safety brakes on said vehicle by spring force when fluid pressure in said system falls below a predetermined value,
expansible chamber means operative for releasing said safety brakes against said spring force only when said fluid pressure in said system is above said predetermined value,
and means for securing said reservoir and said expansible chamber to said frame,
said spring means being positioned within said reservoir,
said apparatus including brake actuating linkage between said spring and expansible chamber and said brakes.

5. Safety brake apparatus for vehicles comprising:
a tank for storing fluid under pressure,
means for supporting said tank on the frame of said vehicle,
safety brake spring means positioned within said tank,
mechanical connection means extending through a wall of said tank for applying said brakes by spring force from said spring means,
an expansible chamber means secured to said tank and having a movable member mechanically connected to said spring means and operative to release said brakes against the force of said spring.

6. Safety brake apparatus for vehicles having a frame and fluid pressure actuated service brake system, said apparatus comprising:
a tank for storing fluid under pressure,
means for supporting said tank on said frame,
safety brake spring means positioned within said tank,
mechanical connection means extending through a wall of said tank for applying said brakes by spring force from said spring means,
an expansible chamber means secured to said tank and having a movable member mechanically connected to said spring means and operative to release said brakes against the force of said spring means only when fluid pressure in said system is above a predetermined value.

7. Safety brake apparatus for vehicles having a frame and a fluid pressure actuated brake system including a brake chamber and brakes carried by an axle, said apparatus comprising:
a tank for storing fluid under pressure,
means for supporting said tank on said frame,
safety brake spring means positioned within said tank,
mechanical connection means extending through a wall of said tank and to said brakes for applying said brakes by spring force from said spring means,
an expansible chamber means secured to said tank and having a movable member mechanically connected to said spring means and operative to release said brakes against the force of said spring means only when fluid pressure in said system is above a predetermined value.

8. Safety brake apparatus for vehicle comprising:
an elongated tank for storing fluid under pressure,
coiled spring means positioned within said tank and extending longitudinally of said tank,
mechanical connection means extending from said spring means through an end of said tank for applying safety brakes by spring force from said spring means, fluid pressure actuator means supported by said end of said tank and operative through said mechanical connection means for releasing said brakes against said spring force.

9. Safety brake apparatus for vehicles comprising:
an elongated tank for storing fluid under pressure,
a pair of coil spring means positioned within said tank and extending longitudinally of said tank,
mechanical connection means extending from each of said spring means through an end of said tank for applying safety brakes by spring force from said spring means,
fluid pressure actuator means supported by each end of said tank and operative for releasing said brakes against said spring force.

10. Safety brake apparatus for vehicles comprising:
an elongated tank for storing fluid under pressure,
compression coil spring means positioned within said tank and extending longitudinally of said tank,
mechanical connection means extending from one end of said spring means axially through said spring means and through an end of said tank for applying safety brakes by spring force from said spring means,
fluid pressure actuator means supported by said end of said tank and surrounding and connected to said mechanical connection means and operative for releasing said brakes against said spring force.

11. Safety brake apparatus for vehicles having a fluid pressure actuated service brake system including brakes carried by an axle, said apparatus comprising:
an elongated tank for storing fluid under pressure,
compression coil spring means positioned within said tank and extending longitudinally of said tank,
mechanical connection means extending from said spring means through an end of said tank for applying said brakes by spring force from said spring means,
fluid pressure actuator means supported by an end of said tank and connected to said mechanical connection means and operative for releasing said brakes against said spring force only when fluid pressure in said system is above a predetermined value.

12. Safety brake apparatus for vehicles comprising:
a storage reservoir for fluid under pressure,
spring means for applying safety brakes on said vehicle by spring force,
expansible chamber means operative for releasing said safety brakes against said spring force,
said spring means being positioned within said reservoir,
and supplemental manually controlled means for releasing said safety brakes against said spring force.

13. Safety brake apparatus for vehicles comprising:
an elongated storage reservoir for fluid under pressure,
compression coil spring means for applying safety brakes on said vehicle by spring force,
expansible chamber means operative for releasing said safety brakes against said spring force,
said expansible chamber means being attached to one end of said reservoir,
and said spring means being positioned within and extending axially of said reservoir and having one end adjacent said expansible chamber,
and supplemental manually controlled means positioned at the other end of said spring means for compressing said spring means and releasing said safety brakes against said spring force.

14. Safety brake apparatus for vehicles comprising:
a storage reservoir for fluid under pressure,
spring means for applying safety brakes on said vehicle by spring force,
expansible chamber means operative for releasing said safety brakes against said spring force,
said expansible chamber means being attached to said reservoir,
said spring means being positioned within said reservoir,
and supplemental manually actuated means for releasing said safety brakes against said spring force,
said manually actuated means including a manually operable jack at least partly mounted in said tank and operable from the exterior of said tank.

15. Safety brake apparatus for vehicles comprising:
a storage reservoir for fluid under pressure,
compression coiled spring means for applying safety brakes on said vehicle by spring force,
expansible chamber means operative for releasing said safety brakes against said spring force,
said expansible chamber means being attached to said reservoir,
said spring means being positioned within said reservoir,
and supplemental manually actuated means for releasing said safety brakes against said spring force,
said manually actuated means including a manually operable hydraulic jack at least partly mounted in said tank and operable from the exterior of said tank.

16. Safety brake apparatus for vehicles comprising:
an elongated storage reservoir for fluid under pressure,
a pair of compression coiled spring means for applying safety brakes on said vehicle by spring force,
a pair of expansible chamber means operative for releasing said safety brakes against the force of said springs,
one of said expansible chamber means being attached to each end of said reservoir,
said spring means being positioned within said reservoir and each being connected to one of said expansible chamber means,
and supplemental manually actuated means for releasing said safety brakes against said spring force,
said manually actuated means including a manually operable hydraulic jack mounted in said tank between said springs and operable from the exterior of said tank.

17. Safety brake apparatus for vehicles having an operators cab, said apparatus comprising:
a reservoir for fluid under pressure,
spring means for applying safety brakes on said vehicle by spring force,
expansible chamber means operative for releasing said safety brakes against said spring force,
said expansible chamber means being attached to said reservoir and said spring means being positioned within said reservoir,
and supplemental manually actuated means for releasing said safety brakes against said spring force,
said manually actuated means including a hydraulic jack at least partly mounted in said tank and manually operable hydraulic pump means located in said cab for supplying hydraulic fluid under pressure to said jack.

No references cited.

UNITED STATES PATENT OFFICE
CERTIFICATE OF CORRECTION

Patent No. 3,095,067                              June 25, 1963

Anthony F. Murty et al.

It is hereby certified that error appears in the above numbered patent requiring correction and that the said Letters Patent should read as corrected below.

In the drawings, Sheet 4, Fig. 10, for the reference numeral "118" applied to the valve on the TRAILER read -- 117 --.

Signed and sealed this 14th day of January 1964.

(SEAL)
Attest:

ERNEST W. SWIDER

Attesting Officer

EDWIN L. REYNOLDS

Acting Commissioner of Patents